US007481489B2

(12) United States Patent
Demick

(10) Patent No.: US 7,481,489 B2
(45) Date of Patent: Jan. 27, 2009

(54) VEHICLE SEAT ASSEMBLY

(75) Inventor: Robert L. Demick, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/686,986

(22) Filed: Mar. 16, 2007

(65) Prior Publication Data
US 2008/0224509 A1 Sep. 18, 2008

(51) Int. Cl.
A47C 31/02 (2006.01)
(52) U.S. Cl. .............. 297/218.1; 297/218.2; 297/218.3; 297/218.5; 297/452.6
(58) Field of Classification Search .............. 297/218.1, 297/218.2, 218.3, 218.5, 452.6
See application file for complete search history.

(56) References Cited

U.S. PATENT DOCUMENTS

| 3,298,743 | A | * | 1/1967 | Albinson, et al. ..... 297/218.5 X |
| 4,789,201 | A | * | 12/1988 | Selbert ..................... 297/218.1 |
| 5,302,001 | A | * | 4/1994 | van Dis ................ 297/452.6 X |
| 5,605,373 | A | * | 2/1997 | Wildern et al. ........ 297/218.3 X |
| 5,733,001 | A | * | 3/1998 | Roberts .................... 297/218.1 |
| 5,826,312 | A | * | 10/1998 | Schroder et al. ...... 297/218.3 X |
| 5,829,828 | A | * | 11/1998 | Asfaw ................ 297/218.1 X |
| 5,964,017 | A | * | 10/1999 | Roberts .............. 297/218.1 X |
| 6,283,552 | B1 | * | 9/2001 | Halse et al. .......... 297/218.1 X |
| 6,899,399 | B2 | * | 5/2005 | Ali et al. .................. 297/452.6 |
| 6,964,453 | B1 | * | 11/2005 | Flegal et al. ............. 297/452.6 |
| 7,134,730 | B2 | * | 11/2006 | Flegal et al. ............. 297/452.6 |
| 2007/0069559 | A1 | * | 3/2007 | Poulakis .................. 297/218.2 |

* cited by examiner

Primary Examiner—Rodney B. White

(57) ABSTRACT

A vehicle seat assembly is configured for mating engagement with a selectively interchangeable first trim cover portion having a first attachment member. The seat assembly includes a foam cushion, a second trim cover portion having a second attachment member, and a clip defining first and second recesses operatively connected to the foam cushion. The clip is configured such that the first attachment member is insertable into the first recess for snap-fit engagement with the clip to retain the first trim cover portion with respect to the cushion. The second attachment member is in snap-fit engagement with the clip in the second recess to retain the second trim cover portion with respect to the cushion.

11 Claims, 2 Drawing Sheets

# VEHICLE SEAT ASSEMBLY

TECHNICAL FIELD

This invention relates to vehicle seat assemblies having a clip configured to connect two different portions of a trim cover to a cushion.

BACKGROUND OF THE INVENTION

A vehicle seat typically includes foam cushions that separate an occupant from a rigid seat frame and that are compressible to conform to the contours of the occupant so that the occupant is comfortably supported. Flexible trim covers, such as fabric, leather, or vinyl, cover the foam cushions and form the occupiable outer surface of the seat. A vehicle seat is typically characterized by a lower seat portion and a seatback portion. The lower seat portion defines a generally horizontal surface to support an occupant, and the seatback portion defines a generally vertical surface to support the back of an occupant.

SUMMARY OF THE INVENTION

A vehicle seat assembly is provided. The vehicle seat assembly is configured for mating engagement with a selectively interchangeable first trim cover portion having a first attachment member. The seat assembly includes a cushion, a second trim cover portion having a second attachment member, and a clip that is operatively connected to the cushion. The clip defines first and second recesses.

The clip is configured such that the first attachment member is insertable into the first recess for snap-fit engagement with the clip to retain the interchangeable first trim cover portion with respect to the foam cushion. The second attachment member is in snap-fit engagement with the clip in the second recess to retain the second trim cover portion with respect to the cushion.

The vehicle seat assembly provided herein improves upon the prior art by providing an effective and discrete, yet selectively releasable, fastening system for retaining trim cover portions. Accordingly, the vehicle seat assembly provided herein facilitates the use of personalized or customized vehicle seating surfaces, rapid substitution of seating surface materials or designs, and facilitates cleaning or replacement of seating surfaces.

A fastener system for engaging first and second attachment members is also provided. The fastener system includes a strip of material that is characterized by a plurality of locally weakened segments at which the strip is selectively breakable into separate components. The strip also defines a first channel and a second channel that extend across the plurality of locally weakened segments. The strip is configured such that the first attachment member is insertable into the first channel for snap-fit engagement with the strip and the second attachment member is insertable into the second channel for snap-fit engagement with the strip.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
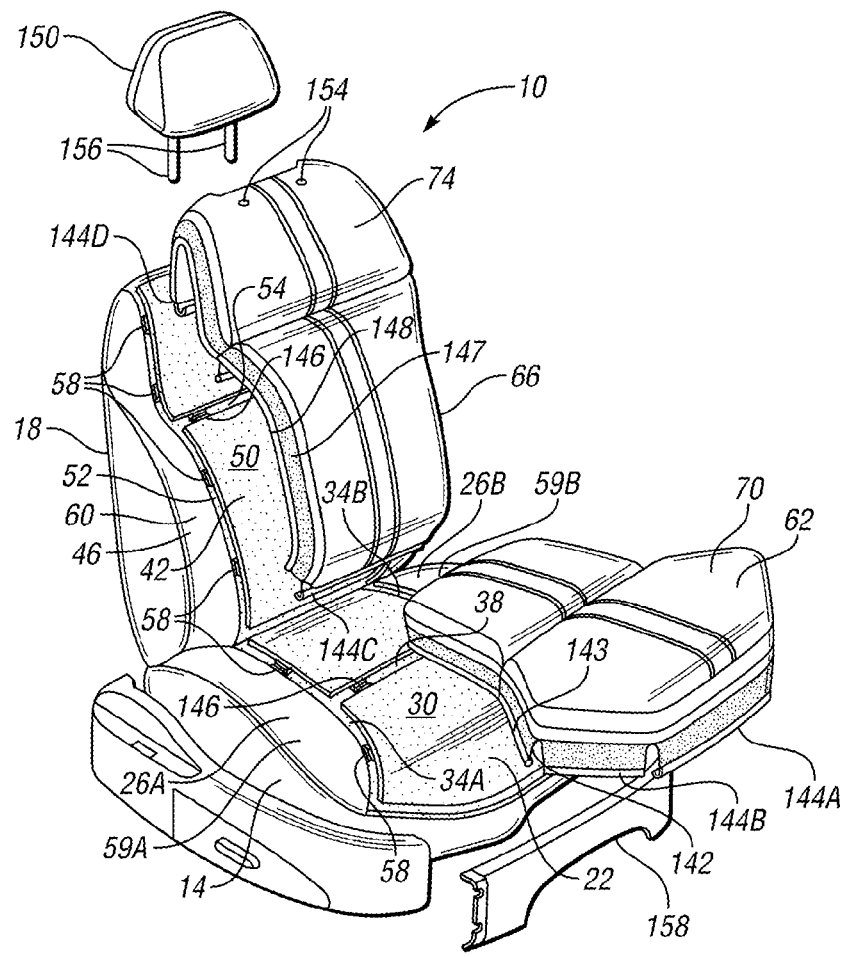
FIG. 1 is a schematic, partially exploded, perspective view of a seat assembly including a plurality of clips.

Referring to FIG. 1, a seat assembly 10 for a vehicle is schematically depicted. The seat assembly 10 includes a lower seat portion 14 and a seatback portion 18. The seatback portion 18 is mounted with respect to the lower seat portion 14; the seatback portion 18 may be rigidly mounted with respect to the lower seat portion 14, or pivotably mounted with respect to the lower seat portion 14 such that an occupant can adjust the angle formed between the seatback portion 18 and the lower seat portion 14, as understood by those skilled in the art. In the embodiment depicted, the seat assembly 10 is a bucket seat. However, those skilled in the art will recognize a variety of seat types and configurations that may be employed within the scope of the claimed invention. For example, bench seats, split bench seats, split-seatback bench seats, etc., may be employed within the scope of the claimed invention.

Lower seat portion 14 includes a foam cushion 22. Exemplary materials used to form the foam cushion include polyurethane, polypropylene, etc. The foam cushion 22 partially defines two lateral bolsters 26A, 26B and a central portion 30 between the two lateral bolsters 26A, 26B. The foam cushion 22 also defines trench 34A, which extends between bolster 26A and the central portion 30, and trench 34B, which extends between bolster 26B and the central portion 30. The foam cushion also defines trench 38, which extends through the central portion 30 from bolster 26A to bolster 26B.

Seatback portion 18 includes foam cushion 42, which partially defines two lateral bolsters, only which of which is shown in FIG. 1 at 46. The foam cushion also defines a central portion 50 between the two lateral bolsters 46. A trench 52 is formed by the cushion 42 between the bolster 46 and the central portion 50. Another trench 54 is formed by the cushion 42 and extends across the central portion 50.

The seat assembly 10 includes a plurality of clips 58. In the embodiment depicted, four clips 58 are at least partially disposed within trench 52 and are mounted to the foam cushion 42. Two clips 58 are at least partially disposed within trench 34A and are mounted to the foam cushion 22.

A plurality of flexible trim cover portions are employed to define the occupiable outer surface of the seat assembly 10. Trim cover portions 59A, 59B define the outer surfaces of bolsters 26A, 26B. Trim cover portion 60 defines the outer surface of bolster 46. Two selectively detachable trim cover inserts 62, 66 are mountable to the seat assembly 10 via the clips 58. Trim cover insert 62 includes trim cover portion 70, and trim cover insert 66 includes trim cover portion 74.

Figure 2:
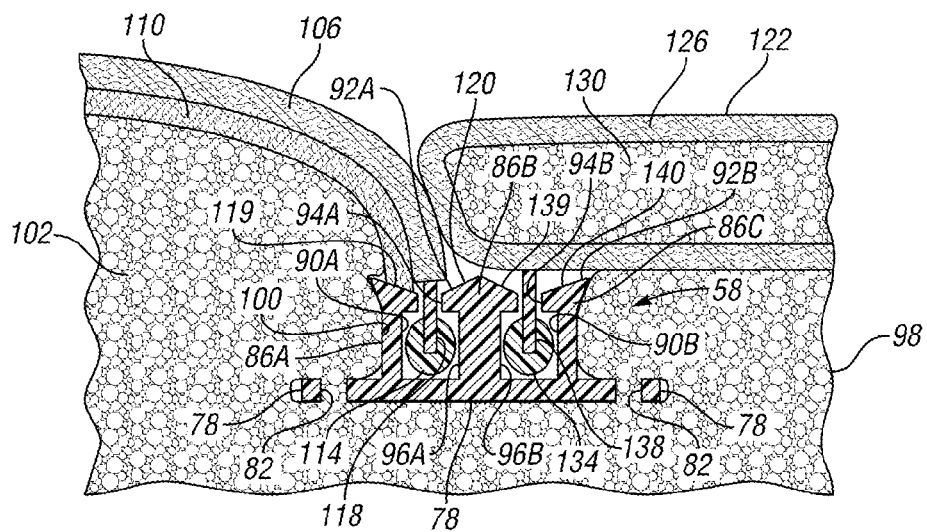
FIG. 2 is a schematic, cross-sectional view of one of the clips of FIG. 1 operatively connecting two trim cover portions to a seat cushion.

Each clip 58 is configured to connect two trim cover portions to a respective one of the cushions 22, 42. Referring to FIG. 2, clip 58 includes a base portion 78. The base portion 78 defines a plurality of holes 82. The clip 58 includes three arms 86A, 86B, 86C that protrude from the base 78. Arms 86A and 86B define a recess 90A therebetween. Arms 86B and 86C define recess 90B therebetween. Recesses 90A and 90B are elongated channels in the embodiment depicted. Arms 86A and 86B also cooperate to define an opening 92A of recess 90A, and arms 86B and 86C cooperate to define an opening 92B of recess 90B. Recess 90A is characterized by a terminal end portion 96A that is adjacent the base portion 78 and at the opposite end of the recess 90A from the opening 92A. Recess 90B is characterized by a terminal end portion 96B that is adjacent the base portion 78 and at the opposite end of the recess 90B from the opening 92B. Arms 86A and 86B also cooperate to define a local restriction 94A of channel 90A between the opening 92A and the terminal end portion 96A. Arms 86B and 86C cooperate to define a local restriction 94B of channel 90B between the opening 92B and the terminal end portion 96B.

Clip 58 is mounted to a foam cushion 98, which is representative of cushions 22 and 42 of FIG. 1. More specifically, in the embodiment depicted, the base portion 78 of clip 58 is molded into the foam cushion 98. The cushion 98 extends through apertures 82, thereby to further encapsulate the clip 58. The arms 86A, 86B, 86C of the clip 58 are disposed within a trench 100 defined by the cushion 98 such that openings 92A, 92B are accessible through the opening of the trench 100. Trench 100 is representative of trenches 34A, 34B, and 52 of FIG. 1.

Bolster 102, which is representative of bolsters 26A, 26B, 46 of FIG. 1, is partially defined by cushion 98, and a first trim cover portion 106. Trim cover portion 106 defines the outer surface of the bolster 102, and is representative of trim cover portions 59A, 59B, and 60 of FIG. 1. Optionally, a pad 110 separates the cushion 98 and the first trim cover portion 106.

The clip 58 connects the first trim cover portion 106 to the cushion 98. More specifically, an attachment member 114 is mounted to first cover portion 106 via a flexible listing 118. In an exemplary embodiment, the attachment member 114 is an elongated member having a generally constant cross-sectional shape and size along its length. The attachment member 114 in the embodiment depicted is characterized by a generally elliptical cross-sectional shape.

The member 114 is configured for snap-fit engagement with the clip 58 in the recess 90A. More specifically, the width of the recess 90A at restriction 94A is narrower than the width of the recess 90A at the terminal end portion 96A and at the opening 92A. That is, the distance between the arms 86A, 86B at the restriction 94A is less than the distance between the arms 86A, 86B at the terminal end portion 96A and at the opening 92A. Insertion of the member 114 into the terminal end portion 96A is achieved by causing the member 114 to traverse the opening 92A and the restriction 94A.

The opening 92A is tapered to facilitate the insertion of the member 114 into the opening 92A and to guide the member 114 into alignment with the restriction 94A. More specifically, arm 86A defines surface 119, and arm 86B defines surface 120. Surfaces 119 and 120 cooperate to define the opening 92A therebetween. The distance between the surfaces 119, 120 decreases with proximity to the restriction 94A.

The recess 90A at the restriction 94A is characterized by a predetermined width, which is less than the width of member 114. As the member 114 traverses the opening 92A, the member 114 contacts surfaces 119, 120. The surfaces 119, 120 are inclined with respect to the direction of movement of the member 114 through the recess 90A. Accordingly, when a force is exerted on the member 114 in the direction of movement of the member 114 into the recess 90A, the member 114 exerts a force on each of the surfaces 119, 120 that has a component normal to the direction of movement of the member 114, which urges the arms 86A, 86B apart from one another so that the width of the restriction 94A increases sufficiently to allow the member 114 to pass therethrough and into the terminal end portion 96A.

The arms 86A, 86B are resilient, and thus, when the member 114 has traversed the restriction 94A and is disposed within the terminal end portion 96A as shown in FIG. 2, the arms 86A, 86B return to their original positions with respect to one another so that the recess 90A at the restriction 94A returns to the predetermined width, thereby providing a snap-fit engagement between the clip 58 and the member 114.

A selectively detachable trim cover insert 122 is representative of the detachable trim cover inserts shown at 62 and 66 in FIG. 1. The trim cover insert 122 includes a second trim cover portion 126 that is representative of the trim cover portions shown at 70 and 74 in FIG. 1. In the embodiment depicted, the insert 122 includes a cushion 130 that is bonded to the second trim cover portion 126. The clip 58 connects the second trim cover portion 126 to the cushion 98. More specifically, an attachment member 134 is mounted to second trim cover portion 126 via a flexible listing 138. In an exemplary embodiment, the attachment member 134 is an elongated member having a generally constant cross-sectional shape and size along its length. The attachment member 134 in the embodiment depicted is characterized by a generally elliptical cross-sectional shape.

The member 134 is configured for snap-fit engagement with the clip 58 in the recess 90B. More specifically, the width of the recess 90B at restriction 94B is narrower than the width of the recess 90B at the terminal end portion 96B and at the opening 92B. That is, the distance between the arms 86B, 86C at the restriction 94B is less than the distance between the arms 86B, 86C at the terminal end portion 96B and at the opening 92B. Insertion of the member 134 into the terminal end portion 96B is achieved by causing the member 134 to traverse the opening 92B and the restriction 94B.

The opening 92B is tapered to facilitate the insertion of the member 134 into the opening 92B and to guide the member 134 into alignment with the restriction 94B. More specifically, arm 86B defines surface 139, and arm 86C defines surface 140. Surfaces 139 and 140 cooperate to define the opening 92B. The distance between the surfaces 139, 140 decreases with proximity to the restriction 94B.

The recess 90B at the restriction 94B is characterized by a predetermined width, which is less than the width of member 134. As the member 134 traverses the opening 92B, the member 134 contacts surfaces 139, 140. The surfaces 139, 140 are inclined with respect to the direction of movement of the member 134 through the recess 90B. Accordingly, when a force is exerted on the member 134 in the direction of movement of the member 134 into the recess 90B, the member 134 exerts a force on each of the surfaces 139, 140 that has a component normal to the direction of movement of the member 134, which urges the arms 86B, 86C apart from one another so that the width of the restriction 94B increases sufficiently to allow the member 134 to pass therethrough and into the terminal end portion 96B.

The arms 86B, 86C are resilient, and thus, when the member 134 has traversed the restriction 94B and is disposed within the terminal end portion 96B as shown in FIG. 2, the arms 86B, 86C return to their original positions with respect to one another so that the recess 90B at the restriction 94B returns to the predetermined width, thereby providing a snap-fit engagement between the clip 58 and the member 134.

Referring again to FIG. 1, the clips 58 in trench 34A operatively connect trim cover portion 59A to the cushion 22. Trim cover insert 62 includes listing 142 that operatively connects attachment member 143 to the trim cover portion 70. The clips 58 in trench 34A are engageable with the attachment member 143 to secure the trim cover portion 70 to the cushion 22. Clips (not shown) in trench 34B operatively connect trim cover portion 59B to the cushion 22, and operatively connect the trim cover portion 70 to the cushion 22. J-shaped clips 144A, 144B are operatively connected to the forward portion of the trim cover insert 62 to engage complementary fastening elements (not shown) on the cushion 22. Clips 146 are mounted in trench 38 to further connect the insert 62 to the cushion 22.

The clips 58 in trench 52 operatively connect trim cover portion 60 to the cushion 42. Trim cover insert 66 includes listing 147 that operatively connects attachment member 148 to the trim cover portion 74. The clips 58 in trench 52 are engageable with the attachment member 148 to secure the trim cover portion 74 to the cushion 42. J-shaped clip 144C is operatively connected to the lower edge of trim cover insert 66 to engage a complementary fastening element (not shown). J-shaped clip 144D is operatively connected to a section of the trim cover insert 66 that extends on the rear side of the seatback portion 18; clip 144D is engageable with a complementary fastening element (not shown) on the rear side of the seatback portion 18. The headrest 150 is selectively removable from the seatback portion 18 so that the trim cover insert 66 can extend over the top of the seatback portion 18 during installation of the insert. The cover portion 74 defines holes 154 through which posts 156 for supporting the headrest 150 extend. Posts 156 may be mounted to the headrest 150, as shown, or mounted to the seatback portion 18. Clips 146 are mounted in trench 54 to further connect the insert 66 to the cushion 42. A selectively detachable trim member 158 is mountable to the lower seat portion 14 to obscure the clips 144A, 144B.

Figure 3:
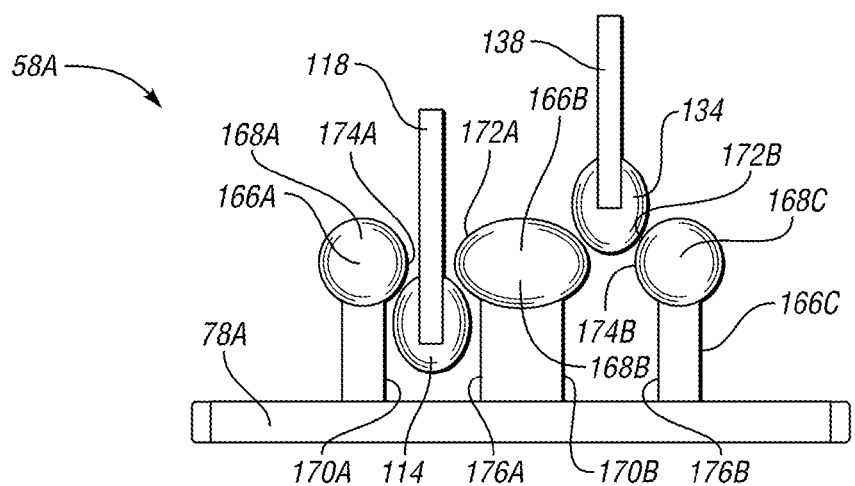
FIG. 3 is a schematic, cross-sectional view of an alternative clip configuration for use in the seat assembly of FIG. 1.

Referring to FIG. 3, wherein like reference numbers refer to like components from FIGS. 1 and 2, an alternative clip configuration for use in the seat assembly 10 of FIG. 1 is shown at 58A. Clip 58A includes a base portion 78A. The clip 58A also includes first, second, and third arms 166A, 166B, 166C that protrude from the base portion 78A. The terminal ends 168A, 168C of arms 166A, 166C are characterized by a circular cross section. The terminal end 168B of arm 166B is characterized by an elliptical cross section.

Arms 166A and 166B cooperate with the base portion 78A to define a recess, namely channel 170A, therebetween. Channel 170A is characterized by a tapered opening 172A and a restriction 174A, both of which are defined between the terminal ends 168A, 168B. Channel 170A is also characterized by a terminal end portion 176A adjacent to the base portion 78A. Arms 166B and 166C cooperate with the base portion 78A to define a recess, namely channel 170B, therebetween. Channel 170B is characterized by a tapered opening 172B and a restriction 174B, both of which are defined between the terminal ends 168B, 168C. Channel 170B is also characterized by a terminal end portion 176B adjacent to the base portion 78A.

The clip 58A is configured for snap-fit engagement with members 114 and 134. Restrictions 174A, 174B are characterized by a predetermined width that is less than the width of the members 114, 134. Insertion of members 114, 134 into the terminal end portions 176A, 176B through the restrictions 174A, 174B causes the arms 166A, 166B, 166C to resiliently deflect, thereby enlarging the restrictions 174A, 174B sufficiently for members 114, 134 to pass therethrough. Member 114 is shown in snap-fit engagement with the clip 58A in the terminal end portion 176A of recess 170A. Member 134 is shown in the opening 172B of channel 170B.

Figure 4:
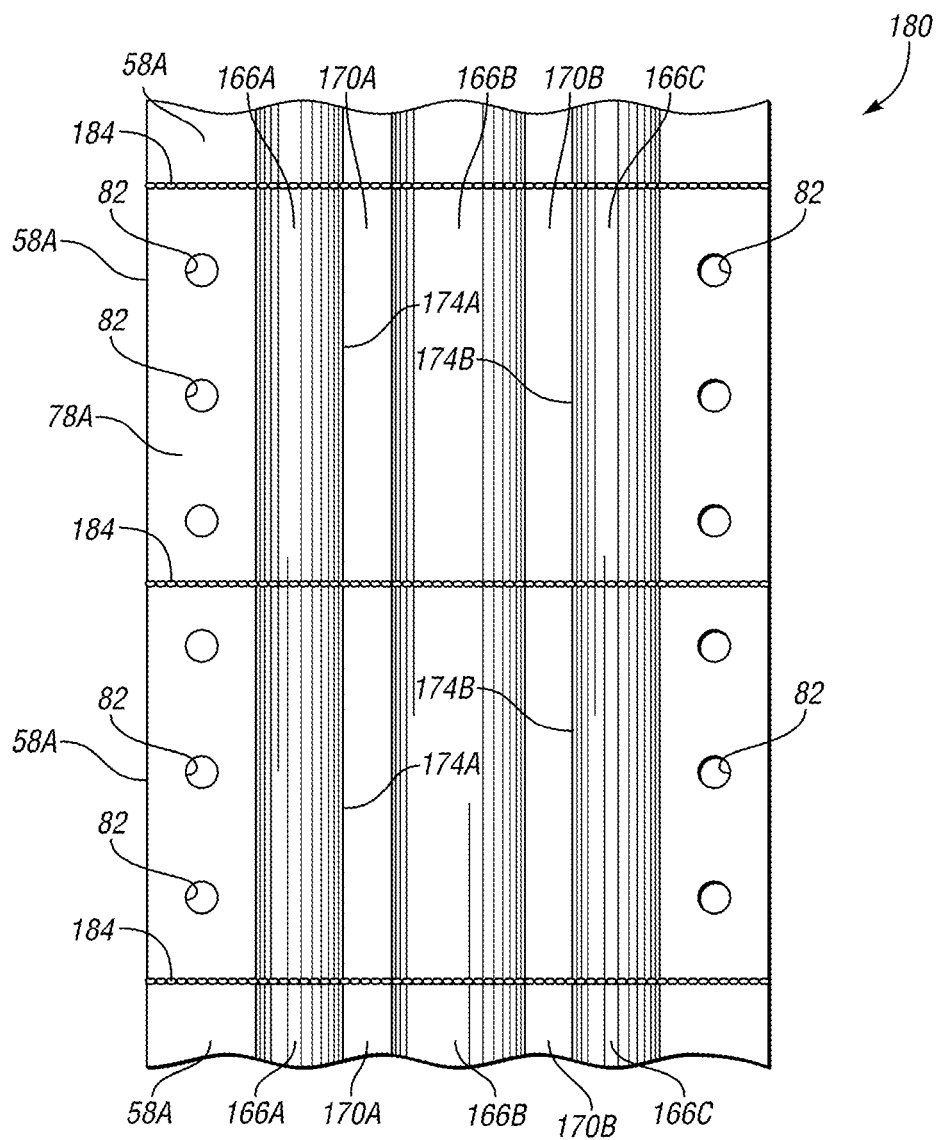
FIG. 4 is a schematic, top view of a strip defining a plurality of clips that are selectively separable from the strip.

Referring to FIG. 4, wherein like reference numbers refer to like components from FIG. 3, a one-piece extruded strip 180 is characterized by a substantially constant cross sectional shape along its length. The strip 180 is also characterized by a plurality of locally weakened segments 184 at which the strip is selectively breakable. The locally weakened segments 184 are placed at predetermined intervals along the length of the strip 180. In the embodiment depicted, the locally weakened segments include perforations. The strip 180 includes a base portion 78A with holes 82 formed therein. The strip also defines arms 166A, 166B, 166C. Arms 166A and 166B define channel 170A therebetween. Arms 166B and 166C define channel 170B therebetween. The arms 166A, 166B, 166C, and therefore channels 170A, 170B, extend across the plurality of locally weakened segments 184. Individual clips 58A are formed between the locally weakened segments 184. The strip 180 having a plurality of interconnected clips 58A that are selectively separable from the strip 180 facilitates ease of material handling during the molding process in which the clips 58A are molded into a cushion.

It should be noted that the clips of FIGS. 1-4 include three arms that cooperate to define two recesses. However, and within the scope of the claimed invention, four or more arms may be employed. For example, first and second arms may define a first recess therebetween, and third and fourth arms may cooperate to define a second recess therebetween.

While the best modes for carrying out the invention have been described in detail, those familiar with the art to which this invention relates will recognize various alternative designs and embodiments for practicing the invention within the scope of the appended claims.

The invention claimed is:

1. A vehicle seat assembly configured for mating engagement with a selectively interchangeable first trim cover portion having a first attachment member, the vehicle seat assembly comprising:

a foam cushion;

a second trim cover portion having a second attachment member; and a clip defining first and second recesses operatively connected to the foam cushion;

said clip being configured such that the first attachment member is insertable into the first recess for snap-fit engagement with the clip to retain the interchangeable first trim cover portion with respect to the foam cushion; and said second attachment member being in snap-fit engagement with said clip in said second recess to retain the second trim cover portion with respect to the cushion;

wherein the clip includes a base portion and first, second, and third arms protruding from said base portion; said first and second arms cooperating to define the first recess; and said second and third arms cooperating to define said second recess.

2. The vehicle seat assembly of claim 1, wherein said foam cushion encapsulates at least part of said base portion.

3. The vehicle seat assembly of claim 2, wherein the base portion defines a plurality of apertures; and wherein said foam cushion extends through said plurality of apertures.

4. The vehicle seat assembly of claim 1, wherein the clip is one-piece.

5. The vehicle seat assembly of claim 1, wherein the first and second recesses are channels.

6. A vehicle seat assembly comprising:

a lower seat portion;

a seatback portion operatively connected to the lower seat portion;

a foam cushion forming at least one of the lower seat portion and the seatback portion;

a clip being operatively connected to the foam cushion and defining a first channel characterized by a first opening and a second channel characterized by a second opening;

a first trim cover portion;

a first attachment member mounted with respect to the first trim cover portion and being in snap-fit engagement with the clip in the first channel to retain the first trim cover portion with respect to the foam cushion;

a second trim cover portion; and a second attachment member mounted with respect to the second trim cover portion and being in snap-fit engagement with the clip in the second channel to retain the first trim cover portion with respect to the foam cushion;

wherein the clip includes a base portion and first, second, and third arms protruding from said base portion; said first and second arms cooperating to define the first channel; and said second and third arms cooperating to define said second channel.

7. The vehicle seat of claim 6, wherein the first trim cover portion contacts the second trim cover portion.

8. The vehicle seat of claim 6, wherein the foam cushion is part of the seatback portion.

9. The vehicle seat of claim 6, wherein the foam cushion is part of the lower seat portion.

10. The vehicle seat of claim 6, wherein the foam cushion defines a trench; and wherein the clip is at least partially disposed within the trench.

11. The vehicle seat of claim 6, wherein the clip is one-piece.

* * * * *